Jan. 21, 1947.  L. A. DE ROSA  2,414,454
CONTROL CIRCUIT
Filed Jan. 4, 1943  3 Sheets-Sheet 1

INVENTOR.
LOUIS A. DeROSA
BY
ATTORNEY

Jan. 21, 1947.   L. A. DE ROSA   2,414,454
CONTROL CIRCUIT
Filed Jan. 4, 1943   3 Sheets-Sheet 3

INVENTOR.
LOUIS A. DE ROSA
BY
ATTORNEY

Patented Jan. 21, 1947

2,414,454

UNITED STATES PATENT OFFICE 2,414,454

CONTROL CIRCUITS

Louis A. de Rosa, Staten Island, N. Y., assignor to Federal Telephone and Radio Corporation, Newark, N. J., a corporation of Delaware Application January 4, 1943, Serial No. 471,239

8 Claims. (Cl. 250—27)

This invention relates to control circuits and more particularly to wave producing means which may, for example, serve to variably control a scanning mechanism of an oscillograph or similar device.

In a copending application of Edmond M. Deloraine, Henri G. Busignies and myself, Serial No. 469,056, filed Dec. 15, 1942, entitled "Facsimile system," there is described a facsimile or built-up character communication system wherein the successive signals are sent at a variable speed and a receiver is provided with scanning control means variable for producing the transmitted signal on an oscillograph. In order properly to produce these variable transmitted signals, it is necessary to provide scanning speed control circuits.

It is an object of my invention to provide means for producing related trains of impulses differing in length from one another.

It is a further object of my invention to provide means for generating saw-tooth oscillations, one set of oscillations being variable in frequency.

It is a still further object of my invention to provide a wave producing means for controlling the generation of control waves having different frequency power following a predetermined cycle the waves of successive patterns being multiples of the preceding pattern suitable for controlling the scanning of an oscillograph beam.

In accordance with my invention, I provide means for producing a first control voltage having a predetermined cycle of increase and decrease. A first generating means is provided for generating waves of substantially constant amplitude of a period less than the cycle of the control wave and controlling the length of this generated wave in accordance with the control voltage. A second similar generator is also provided. This second generator, however, has a frequency which is substantially a fixed multiple of the first generated wave and which varies in frequency under control of the control voltage.

A better understanding of my invention and the objects and features thereof may be had with reference to the accompanying drawings, in which.

Figure 1:
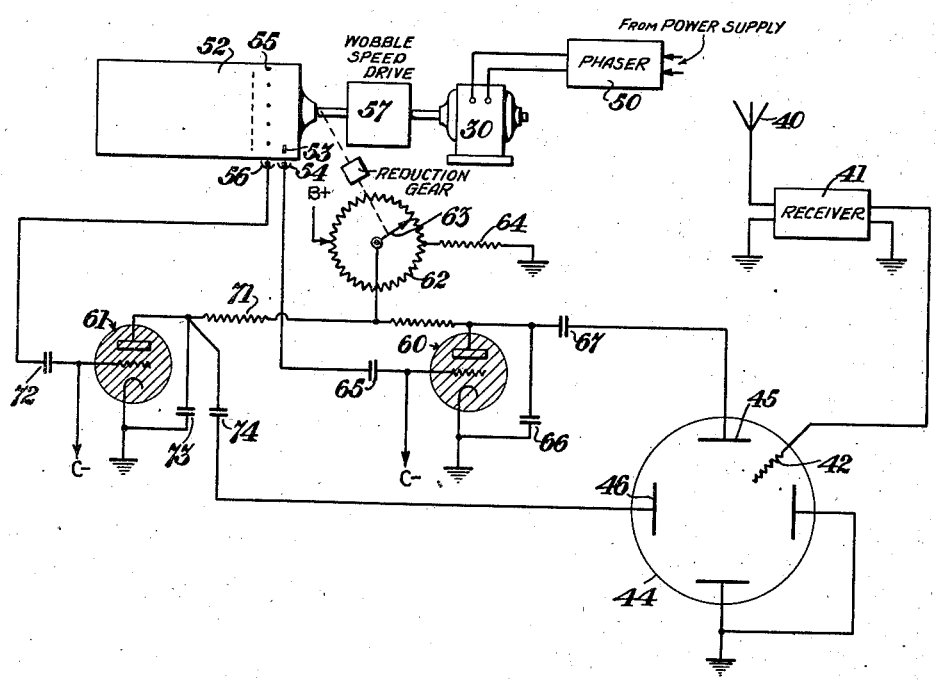
Fig. 1 is a schematic circuit diagram of an embodiment of my invention.
Figure 2:
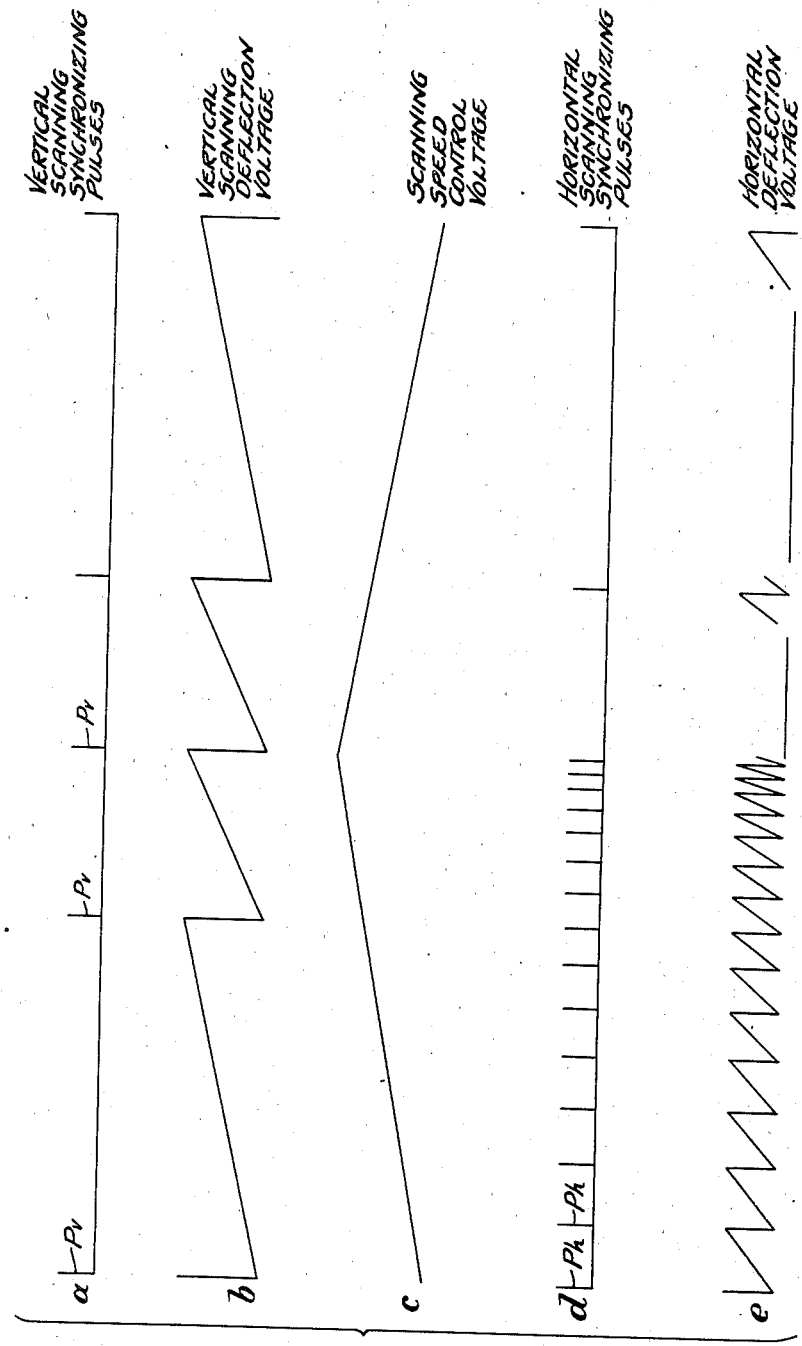
Fig. 2 is a set of curves illustrating the waves produced by the system of Fig. 1.

Turning first to Figs. 1 and 2, there is illustrated an apparatus for controlling the scanning of an oscillograph in accordance with a wave variable in frequency to correspond to frequency variations in a received signal. For this purpose there is provided a receiving antenna 40 coupled to a receiver 41. The received waves may be a series of facsimile pulses transmitted from a drum similar to that shown at 52 in Fig. 1 driven at a predetermined variable speed cycle. It should be understood that the equipment may in this case comprise a transmitting and a receiving set in each unit. The output signals from receiver 40 are applied to a control grid 42 of cathode ray oscillograph 44 to control the intensity of the cathode ray beam. In order to control the deflection of the beam, there are provided vertical deflecting electrodes 45 and horizontal deflecting electrodes 46. The circuit arrangement of Fig. 1 provides the vertical or frame scanning pulses for oscillograph 44 and the horizontal or line scanning potentials for the same oscillograph. Since the facsimile signals or picture transmission signals are being sent at a variable frequency for purposes of secrecy, avoidance of jamming interference or the like, it is necessary that the scanning of the beam be made to coincide properly with the frequency variations of the received signals.

At the receiver power from a supply source is applied over phaser unit 50 to drive motor 30. Motor 30 rotates drum 52 over a wobbled speed drive mechanism 57. It is to be presumed that drum 52 is being wobbled by the drive mechanism in the same manner as the transmitting frequency is being varied. Since the transmitter equipment will normally be disconnected at the time reception is occurring, the transmitter drum 52 may be provided with additional means for producing the scanning voltages needed for reception. At one end the drum 52 is provided with a single perforation 53 effective for producing frame synchronizing pulses through a pick-up cell 54, shown externally of the drum for convenience, and a plurality of other perforations 55 effective through pick-up cell 56 also shown outside the drum, for producing synchronizing pulses for the line scanning mechanism. The frame or vertical synchronizing pulses are indicated at PV, curve $a$, and the line or horizontal synchronizing pulses at PH, curve $d$ of Fig. 2. Since drum 52 is rotated at a variable speed, the pulses produced through 53 and 55 will be variably spaced in time in accordance with the speed of the drum rotation. Accordingly, it is necessary to provde an arrangement whereby the saw-tooth scanning voltages may be caused to reach substantially the same amplitude in variable periods of time.

The scanning generators comprise tubes 60 and 61 serving to produce the frame or vertical scanning pulses and the line or horizontal scanning wave, respectively. These tubes are preferably of the grid controlled gas discharge type known under the trade-mark name of "Thyratron." A positive voltage is supplied from B+ through rheostat 62 and rotating arm 63 to the plate of tube 60. Arm 63 in cooperation with rheostat 62 provides a variation in B supply potential as indicated in curve c of Fig. 2. The midpoint of rheostat 62 opposite to the B supply, is grounded through a resistor 64. The grid of tube 60 is maintained at a slightly negative bias so that normally no current traverses the tube. Positive voltage from B over rheostat 62 and arm 63 serves to charge a condenser 66. This condenser charge slowly builds up after the manner shown in curve b of Fig. 2. Pulses PV of curve a of Fig. 2 illustrates the pulses produced in cell 54 showing the variable spacing due to variation in speeds of rotation of the drum. When one of the pulses PV from cell 54 is applied to the grid of tube 60 over coupling condenser 65, tube 60 becomes conductive serving to discharge condenser 66 producing the straight portion of the saw-tooth wave as shown in curve b of Fig. 2. This pulse passes quickly and condenser 66 again begins to charge. However, arm 63 has rotated to a different position on rheostat 62 and therefore larger voltage is applied for charging condenser 66. The charge, therefore, builds up much more rapidly to a fixed level as shown in the second saw-tooth wave of curve b, at which time the tube is again discharged by the succeeding applied pulse PV. After passing the voltage maximum point of curve c, the voltage is again reduced causing the successive saw-tooth to again increase in length as shown in curve b after which the entire cycle is repeated. The saw-tooth voltage generated in tube 60 and the wave generated in unit 62, 63 is applied over a resistance 71 to the anode of tube 61 and to condenser 73. Also the pulses PH as shown in curve d produced at pick-up cell 56 are successively applied over coupling condenser 72 to the grid of tube 61. The voltage applied over 71 to condenser 73 charges this condenser and because of the increasing voltage the energization is brought to the same level in spite of the shorter periods between the applied pulses from 56. Thus, a variable saw-tooth wave for line scanning such as shown at curve e of Fig. 2 is produced. The output of tube 60 is applied over condenser 67 to the vertical deflector plates of the indicator device and the output waves from tube 61 are applied over coupling condenser 74 to the horizontal deflectors of the indicator.

The rheostat 62 is designed to produce the voltage variations of curve c corresponding to pulses PV and PH for the particular variation in drum speed described. If other time relation of pulses is desired, changes in the rheostat characteristics must be provided to produce a corresponding control voltage variation.

It will be readily appreciated that since motor 39 at the receiver is being driven at substantially the same speed as the motor at the transmitter, and the variable speed drive for both is made substantially identical, it will only be necessary to adjust the phase by means of phaser 50 of energy supplied to this motor with respect to that at the transmitter in order that the characters may be properly reproduced on the screen.

Figure 3:
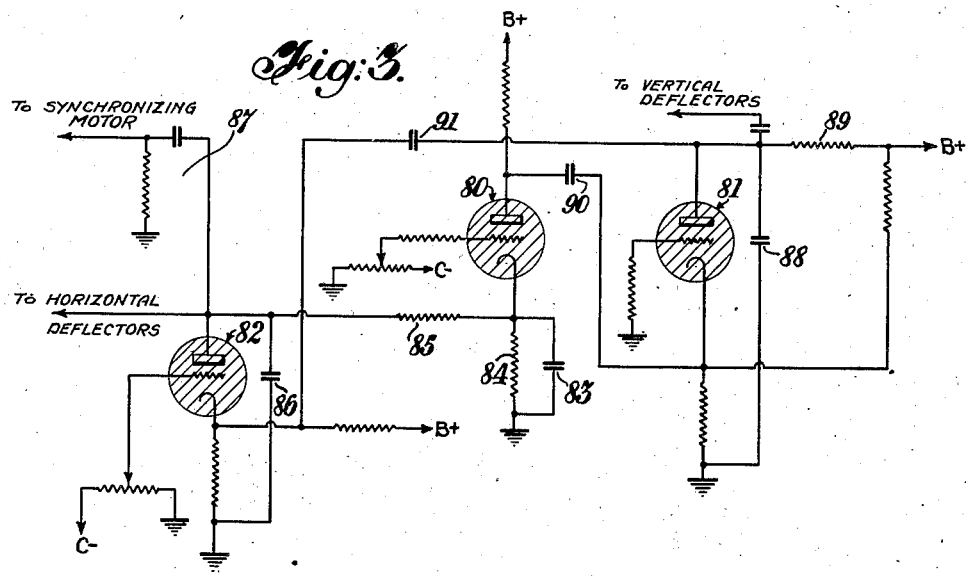
Fig. 3 is a different circuit embodiment in accordance with my invention.

In Fig. 3 is shown a still different circuit arrangement which may be used to provide the two series of waves. This circuit may also provide for a variable frequency supply to drive a scanning motor at the desired variable speed in accordance with the line scanning frequency. The control circuit of Fig. 3 does not depend on rotation of a pulse producing means such as the transmitter drum of Fig. 1 for control of the scanning. In this circuit there are provided three gaseous discharge tubes 80, 81 and 82. A positive voltage is applied at tube 80 and the grid of this tube is negatively biased at the desired negative potential. We may assume first that tube 80 is conductive. As the current flows through tube 80 a charge is built up on condenser 83 tending to oppose the flow of current through tube 80 to the cathode. When this potential has built up to a sufficient extent the current in tube 80 is reduced to such a low value that it is no longer sufficient to maintain ionization. The condenser 83 then discharges through resistor 84. The charge and discharge curve for the condenser 83 is indicated by the curve f of Fig. 4.

Figure 4:
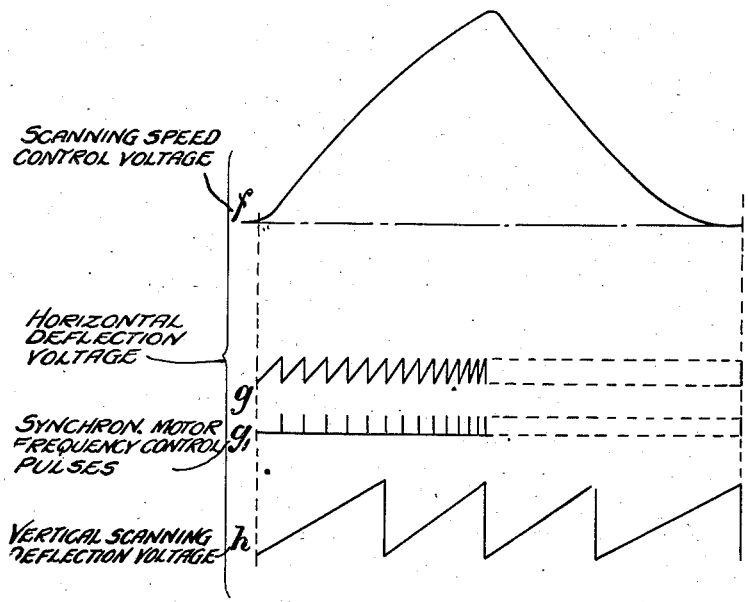
Fig. 4 is a set of curves illustrating the operation of the circuit of Fig. 3.

Variations in plate potential of tube 80 are applied over coupling condenser 90 to the normally positively biased cathode of tube 81. Condenser 88 is meanwhile charging over resistance 89. When the combined effect of the charge at 88 applied to the anode of tube 81, and the negative potential charge applied to the cathode becomes sufficiently high, tube 81 becomes conductive. This then discharges condenser 88 causing the anode voltage of tube 81 to drop to a value insufficient to maintain discharge. The subsequent charge of condenser 88 takes place producing the succeeding saw-tooth oscillation. This oscillation is changed in duration depending upon the voltage applied over 90, being shortened when this voltage increases, and lengthened as this voltage decreases. The resultant curve h of Fig. 4 shows a possible saw-tooth variation which may serve as the vertical scanning wave for the receiver system.

The voltage of condenser 83 is applied over a resistance-condenser network 85, 86 to the anode of tube 82. As the condenser 86 becomes charged, the potential therein builds up as shown by curve g, Fig. 4, until tube 82 becomes conductive, whereupon tube 82 quickly discharges reducing the plate voltage to a value insufficient to maintain discharge. The cycle is then repeated, condenser 86 in this case charging up more quickly due to the higher voltage supplied from condenser 83 so that the period of successive saw-tooth oscillations varies as potential. The time constant of circuit 85, 86 is made to be very much smaller than the time constants of circuit 83 so that a plurality of variable saw-tooth waves of the form shown in curve g are produced serving to provide the line scanning waves for the horizontal deflections of the indicator.

At the same time these saw-tooth waves may be translated over a differentiating circuit 87 serving to produce pulses as at $g_1$ for controlling the frequency of the supply for driving a synchronous motor as mentioned above. The impulses may be applied to a known form of inverter circuit to produce sine wave energy to serve as motor supply.

A coupling condenser 91 is provided between the output of tube 81 and the positively biased cathode of tube 82. This assures the proper timing of the line scanning waves so that they will commence at the beginning of this frame scanning.

Accordingly, with this system, there is produced not only the wave forms which may serve for vertical and horizontal scanning but also an additional controlled frequency pulse wave which may serve to drive a motor at a variable speed. All of these voltages are properly timed with respect to one another since they are all derived from the same common source. In order to adjust the speed of operation, the variation in the bias of tube 80 may be effected. Likewise, proper phasing of the signals may be achieved by controlling the time constants of the circuits of tube 82.

It will be understood that while I have described the wave producing means particularly in connection with oscillograph scanning circuits, this means may be used for any other desired purpose, for example, it is possible that in some cases it might be desirable to provide such a system for controlling the character impression and individual impulses of a normal printer telegraph arrangement. This is particularly true if for reasons of secrecy the transmitting telegraph apparatus is being varied in frequency.

It should also be clear that mirror-type of oscillographs may be used instead of the cathode ray oscillograph illustrated, if desired. Likewise, various forms of saw-tooth generators may be provided and in some cases the control wave may itself consist of half a sine wave oscillation instead of the particular type of generator illustrated.

While I have described above the principles of my invention in connection with specific apparatus, and particular modifications thereof, it is to be clearly understood that this description is made only by way of example and not as a limitation on the scope of my invention as set forth in the objects of my invention and the accompanying claims.

What is claimed is:

1. Wave producing means for controlling the generation of control waves having different frequency patterns following a predetermined cycle, comprising means for producing a first control voltage having a predetermined cycle of increase and decrease, a first generating means for producing waves of substantially constant peak amplitude and of periods less than said predetermined cycle, means for applying said control voltage to said first generating means to control the length of successive of said periods in accordance with said increase and decrease, a second generating means for producing a predetermined number of wave pulsations during each of said periods, means for controlling production of said wave pulsations in accordance with said control voltage, and synchronizing means for said first and second generating means to insure simultaneous initiation of said waves and said wave pulsations.

2. Wave producing means for controlling the generation of control waves having different frequency patterns following a predetermined cycle, comprising means for producing a first control voltage having a predetermined cycle of increase and decrease, a first generating means for producing waves of periods less than said predetermined cycle, means for applying said control voltage to said first generating means to control the length of successive of said periods in accordance with said increase and decrease, a second generating means for producing a predetermined number of wave pulsations of substantially constant peak amplitudes during each of said periods, means for controlling production of said wave pulsations in accordance with said control voltage, and synchronizing means for said first and second generating means to insure simultaneous initiation of said waves and said wave pulsations.

3. Wave producing means according to claim 2 wherein said first and second generating means each comprise electron tubes and associated resistance condenser circuits for producing variable length saw-tooth oscillations.

4. Wave producing means according to claim 2 wherein said synchronizing means comprises a coupling circuit between said first and second generators.

5. Wave producing means according to claim 2 wherein said first and second generating means each comprise electron tubes and associated resistance-condenser circuits for producing variable length saw-tooth oscillations, and said synchronizing means comprises a pulse producing means and connections for applying said produced pulses to trigger said electron tubes.

6. Wave producing means for controlling the generation of control waves having different frequency patterns following a predetermined cycle, comprising means for producing a control voltage having a predetermined cycle of increase and decrease, an electron tube circuit for producing waves of periods less than said predetermined cycle, means for applying said control voltage to said electron tube circuit to control the length of successive of said periods in accordance with said increase and decrease, a second electron tube circuit for producing a predetermined number of wave pulsations of substantially constant peak amplitudes during each of said periods, means for controlling production of said wave pulsations in accordance with said control voltage, and coupling means between the two electron tube circuits to insure simultaneous initiation of said waves and said wave pulsations.

7. Wave producing means for controlling the generation of control waves having different frequency patterns following a predetermined cycle, comprising variable speed rotary means for producing variably spaced pulses, operative with said rotary means for producing a first control voltage having a cycle of increase and decrease corresponding with variations in speed of said rotary means, a first electron tube circuit for producing waves of periods less than said predetermined cycle, means for applying said control voltage to said first electron tube circuit to control the length of successive of said periods in accordance with said increase and decrease, a second electron tube circuit for producing a predetermined number of wave pulsations of substantially constant peak amplitudes during each of said periods, means for controlling production of said wave pulsations in accordance with said control voltage, and coupling means comprising circuits for applying respective of said pulses to said first and second electron tube circuits to insure simultaneous initiation of said waves and said wave pulsations.

8. In a wave producing means for controlling the generation of control waves having different frequency patterns following a predetermined cycle, means for producing a control voltage having a predetermined cycle of increase and decrease, a first generating means for producing waves of periods less than said predetermined cycle, means for applying said control voltage to said first generating means to control the length of successive of said periods in accordance with said increase and decrease, a second generating means for producing a predetermined number of wave pulsations of substantially constant peak amplitudes during each of said periods, and means for controlling production of said wave pulsations in accordance with said control voltage.

LOUIS A. DE ROSA.